(12) United States Patent
Rothkopf

(10) Patent No.: US 10,503,245 B2
(45) Date of Patent: Dec. 10, 2019

(54) RELATIVE INTERTIAL MEASUREMENT SYSTEM

(71) Applicant: Apple Inc., Cupertino, CA (US)

(72) Inventor: Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 137 days.

(21) Appl. No.: 15/271,563

(22) Filed: Sep. 21, 2016

(65) Prior Publication Data

US 2018/0081426 A1 Mar. 22, 2018

(51) Int. Cl.
*G06F 3/01* (2006.01)
*G02B 27/01* (2006.01)
*G06F 3/0346* (2013.01)

(52) U.S. Cl.
CPC .......... *G06F 3/012* (2013.01); *G02B 27/017* (2013.01); *G02B 27/0179* (2013.01); *G06F 3/011* (2013.01); *G06F 3/0346* (2013.01); *G02B 2027/0183* (2013.01); *G02B 2027/0187* (2013.01)

(58) Field of Classification Search
CPC .......................... G06F 3/012; G06F 3/011–012
See application file for complete search history.

(56) References Cited

U.S. PATENT DOCUMENTS

| | | | | |
|---|---|---|---|---|
| 9,244,539 B2 * | 1/2016 | Venable | ................ | G06F 3/0346 |
| 9,547,173 B2 * | 1/2017 | Alaniz | ................... | G06F 3/011 |
| 9,928,653 B2 * | 3/2018 | Atsmon | ................ | G06T 19/006 |
| 9,984,505 B2 * | 5/2018 | Rimon | ................... | G06T 19/006 |
| 10,115,235 B2 * | 10/2018 | Inomata | ................... | G06F 3/012 |
| 2002/0114493 A1 * | 8/2002 | McNitt | ................ | A61B 5/1124 382/107 |
| 2006/0224305 A1 * | 10/2006 | Ansari | ................... | G08C 17/00 701/533 |
| 2006/0284839 A1 * | 12/2006 | Breed | ................... | B60W 50/16 345/156 |
| 2014/0126771 A1 * | 5/2014 | Ramanandan | .......... | G06T 7/004 382/103 |
| 2014/0168261 A1 | 6/2014 | Margolis et al. | | |
| 2015/0002394 A1 * | 1/2015 | Cho | ................... | G02B 27/0093 345/156 |
| 2015/0097863 A1 | 4/2015 | Alaniz et al. | | |

(Continued)

OTHER PUBLICATIONS

U.S. Appl. No. 62/278,397, filed Jan. 13, 2016, Richard J. Topliss et al.

(Continued)

*Primary Examiner* — Gene W Lee

(74) *Attorney, Agent, or Firm* — Robert C Kowert; Kowert, Hood, Munyon, Rankin & Goetzel, P.C.

(57) ABSTRACT

Methods and systems for relative inertial measurement may include a user device configured to couple with a user's body and measure motion of the user's body or a part of the user's body while the user rides in a vehicle. A second inertial measurement device may be configured to move with the vehicle but to not move with movements of the user's body within the vehicle. One or more processors may receive inertial measurements from the first and second inertial measurement devices and determine movement of the user's body or the part of the user's body relative to the vehicle by comparing the received inertial measurements.

18 Claims, 12 Drawing Sheets

(56) References Cited

U.S. PATENT DOCUMENTS

| | | | | |
|---|---|---|---|---|
| 2015/0097864 A1* | 4/2015 | Alaniz | ............... | G06T 19/006 |
| | | | | 345/633 |
| 2015/0279050 A1* | 10/2015 | Yang | ............... | G06T 19/006 |
| | | | | 345/633 |
| 2015/0317834 A1 | 11/2015 | Poulos et al. | | |
| 2016/0249856 A1* | 9/2016 | Miller | ............... | A61B 5/6803 |
| | | | | 702/150 |
| 2016/0320835 A1* | 11/2016 | Kuehne | ............... | B60K 37/00 |
| 2017/0050743 A1* | 2/2017 | Cole | ............... | B64D 43/00 |

OTHER PUBLICATIONS

U.S. Appl. No. 15/271,196, filed Sep. 20, 2016, Seung Wook Kim.
U.S. Appl. No. 62/398,414, filed Sep. 22, 2016, Alexander Shpunt.
U.S. Appl. No. 62/232,855, filed Sep. 25, 2015, Kjell F. Bronder et al.
U.S. Appl. No. 62/398,927, filed Sep. 23, 2016, Patrick S. Piemonte et al.
International Search Report and Written Opinion from PCT/US2017/052588, dated Jan. 3, 2018, Apple Inc., pp. 1-12.

\* cited by examiner

RELATIVE INTERTIAL MEASUREMENT SYSTEM

BACKGROUND

Virtual reality (VR) allows users to experience and/or interact with an immersive artificial environment, such that the user feels as if they were physically in that environment. For example, virtual reality systems may display stereoscopic scenes to users in order to create an illusion of depth, and a computer may adjust the scene content in real-time to provide the illusion of the user moving within the scene. When the user views images through a virtual reality system, the user may thus feel as if they are moving within the scenes from a first-person point of view. Similarly, augmented reality (AR) combines computer generated information with real world images to augment, or add content to, a user's view of the world. The simulated environments of virtual reality and/or the enhanced content of augmented reality may thus be utilized to provide an interactive user experience for multiple applications, such as interacting with virtual training environments, gaming, remotely controlling drones or other mechanical systems, viewing digital media content, interacting with the internet, or the like. In addition, VR systems and/or AR systems may utilize inertial measurements from an inertial measurement unit (IMU) included in a VR or an AR device to determine how images are to be displayed. Also, an IMU may be included in various other types of devices such as controllers used with a VR or an AR device or controllers used for various other purposes.

Conventional virtual reality and augmented reality systems may not be able to separate motion of a user or a user's body part from motion of a reference frame in which the user is travelling, such as a vehicle in which the user is travelling. For example, a user wearing a conventional VR or AR device may be seated in a vehicle and the vehicle may accelerate from a stopped position to a high speed while the user wearing the VR or AR device sits in the vehicle without moving within the vehicle (e.g. no relative motion of the user relative to the reference frame of the vehicle). Because the conventional VR or AR device cannot separate the motion of the user's body from the motion of the vehicle, the conventional VR or AR device may attribute the motion of the vehicle to the user. Thus images displayed to the user on the VR or the AR device may appear to the user as if the user is running through a scene at the same speed and in the same direction the vehicle is travelling. A similar phenomenon occurs in regard to angular motion. For example, a user wearing a conventional VR or AR device may be riding in a vehicle that turns, however the user may not actually turn the user's head when the vehicle turns. A conventional AR or VR device may not be able to separate the motion of the user's head (e.g. not turning) from the motion of the vehicle (e.g. turning). Therefore, the turning motion of the vehicle may be attributed to the user and images displayed to the user on the VR or AR device may appear to be turning or spinning despite the user not turning the user's head. Such discrepancies between a user's relative motion within a vehicle and motion observed by the user via a scene displayed to the user may lead to nausea and sickness of the user. For example, nausea may be caused by oculovestibular mismatch. Likewise, in the case of other types of devices that include IMUs, such as controllers, motion of a vehicle being attributed to the controller may lead to erratic control and unintended consequences.

SUMMARY

Methods and systems for relative inertial measurement may include a system comprising a user device configured to be coupled with a body part of a user's body and move with the body part of the user's body. For example, a user device may be a headset that couples with a user's head, a band that couples with a user's wrist, finger, arm, leg, foot, etc., or another type of device that couples with a body part of a user. The system may also include an inertial measurement device mechanically coupled to the user device and configured to measure movement of the user device as the user device moves with the user's body part and as the user's body moves in a vehicle in which the user is riding. For example, an inertial measurement device may include accelerometers, gyroscopes, and/or magnetometers configured to measure inertial motion in multiple directions. In addition to the inertial measurement device mechanically coupled to the user device, the system may also include an additional inertial measurement device configured to move with the vehicle in which the user is riding without moving with the user's body part to which the user device is attached. Furthermore, the additional measurement device may be configured to measure the movement of the vehicle. The system may also include one or more processors configured to receive inertial measurements from the inertial measurement device mechanically coupled to the user device and receive inertial measurements from the additional inertial measurement device configured to measure movement of the vehicle. The one or more processors may determine relative movement of the user device relative to a reference frame of the movement of the vehicle based on differences between the received inertial measurements from the inertial measurement device and the received inertial measurements from the additional inertial measurement device. Some embodiments may further include a display and the determined relative motion of the user device may be used to determine images to be displayed on the display. Also, in some embodiments, that include a controller, control actions may be determined based, at least in part, on the determined relative movement of the user device.

In some embodiments, a user device may include an inertial measurement device configured to measure movement of the user device both as the user device moves with a part of a user's body to which the user device is coupled and as the user's body moves with a vehicle in which the user is riding. The user device may also include one or more processors configured to receive inertial measurements from the inertial measurement device and receive inertial measurements from an additional inertial measurement device configured to measure movement of the vehicle in which the user is riding, wherein the additional inertial measurement device is configured to move with the vehicle in which the user is riding without moving with the part of the user's body to which the user device is coupled. The one or more processors may determine a relative movement of the user device relative to a reference frame of the movement of the vehicle based on differences between the inertial measurements received from the inertial measurement device and the inertial measurements received from the additional inertial measurement device.

In some embodiments, a method includes receiving inertial measurements from an inertial measurement device coupled with a part of a user's body, wherein the inertial measurement device is configured to measure movement of the part of the user's body as the user's body moves with a vehicle in which the user is riding. The method also includes receiving inertial measurements from an additional inertial measurement device configured to measure movement of the vehicle in which the user is riding, wherein the additional inertial measurement device is configured to move with the vehicle in which the user is riding without moving with the part of the user's body to which the inertial measurement device is coupled. The method may further include determining a relative movement of the part of the user's body relative to a reference frame of the movement of the vehicle based on differences between the inertial measurements received from the inertial measurement device and the inertial measurements received from the additional inertial measurement device.

Figure 1:
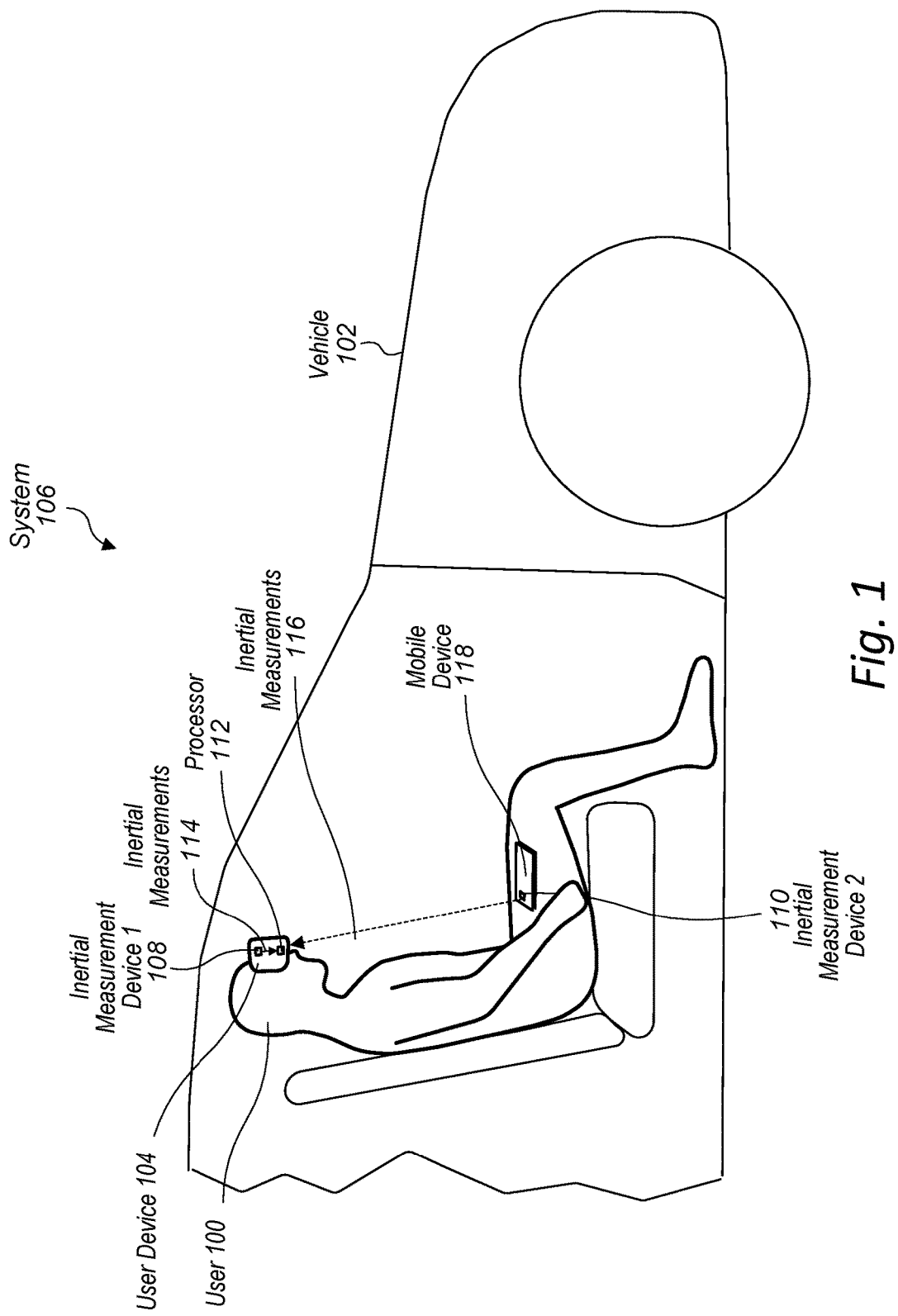
FIG. 1 illustrates a user riding in a vehicle and a system including multiple inertial measurement devices for determining relative motion of the user relative to the vehicle, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

"Or." When used in the claims, the term "or" is used as an inclusive or and not as an exclusive or. For example, the phrase "at least one of x, y, or z" means any one of x, y, and z, as well as any combination thereof.

DETAILED DESCRIPTION

Embodiments of a system, user device, and method are described that implement relative inertial measurement technology to determine relative motion of a user or a part of a user's body relative to a non-fixed reference frame, such as a vehicle in which the user is travelling. In some embodiments, relative inertial measurement technology may be used to determine images to be displayed to a user via a head mounted display based on relative movements of the user's head while the user is travelling in a non-fixed reference frame, such as a vehicle. In some embodiments, relative inertial measurement technology may be used with a controller coupled to a user's body to determine motion of the user's body relative to motion of a non-fixed reference frame in which the user is travelling, such as a moving vehicle.

In some embodiments, a relative inertial measurement system includes at least two inertial measurement devices. A first inertial measurement device may be mechanically coupled with a user device that couples with a part of a user's body. For example, a user device may be a head-mounted display of a virtual reality system or of an augmented reality system. The first inertial measurement device may be mechanically coupled to a part of the head-mounted display. Thus the first inertial measurement device may move with the part of the user's body to which the user device is coupled and may measure movement of the part of the user's body to which the user device is coupled. For example, the first inertial measurement device included in the head-mounted display may measure movement of the user's head.

In the case of a user that is moving in a non-fixed reference frame, such as a vehicle, the first inertial measurement device may measure both the movement of the non-fixed reference frame (e.g. the vehicle) and the movement of the part of the user's body to which the user device is coupled within the non-fixed reference frame. For example, if a user is wearing a head-mounted display that includes the first inertial measurement device and the user turns the user's head to the right 20 degrees at the same time a vehicle in which the user is riding makes a right hand turn of 90 degrees, the first inertial measurement device may measure inertial movement of 110 degrees (e.g. 90 degrees due to the vehicle turning and 20 degrees due to the user turning the user's head within the vehicle).

A relative inertial measurement system may also include a second inertial measurement device or a user device may be configured to receive inertial measurements from a second inertial measurement device. The second inertial measurement device may be configured to move with the non-fixed reference frame (e.g. the vehicle) but to not move with the body part of the user to which the user device that includes the first inertial measurement device is coupled. Thus, the second inertial measurement device may measure movement of the non-fixed reference frame (e.g. the vehicle) without including motion of the user within the non-fixed reference frame in the measurement or without including the motion of the body part of the user within the non-fixed reference frame in the measurement. For example, the second inertial measurement device may be a set of sensors built into a vehicle, may be a device the user attaches to the vehicle, or may be included in a multi-purpose portable device the user is carrying, such as a phone, tablet, computer, or the like that moves with the vehicle but not with the user's body part to which the first inertial measurement device is coupled.

A relative inertial measurement system may also include one or more processors that receive inertial measurements from the first and second inertial measurement devices or the one or more processors may be included in the user device. The one or more processors may determine a relative motion of the user device relative to motion of the non-fixed reference frame (e.g the vehicle) based on differences between the inertial measurements received from the first inertial measurement device and the inertial measurements received from the second inertial measurement device. For example, the one or more processors may determine that the user turned his head 20 degrees by subtracting an inertial measurement from the second inertial measurement device indicating the vehicle turned 90 degrees from an inertial measurement from the first inertial measurement device indicating that the user's head turned an overall amount of 110 degrees. In a similar manner, various other relative inertial motions may be determined by the one or more processors based on received inertial measurements from the first and second inertial measurement devices, such as relative acceleration, relative velocity, position, relative position within the non-fixed reference frame (e.g. the vehicle), three-dimensional orientation within the non-fixed reference frame (e.g. the vehicle), and orientation in three dimensional space with regard to a reference frame outside of the vehicle such as the earth.

FIG. 1 illustrates a user riding in a vehicle and a system including multiple inertial measurement devices for determining relative motion of the user relative to the vehicle, according to some embodiments. User 100 is riding in vehicle 102. Vehicle 102 is illustrated in FIG. 1 as an automobile, however in some embodiments a user, such as user 100, may be riding in various types of vehicles, such as trains, planes, subways, boats, elevators, or other types of vehicles. In some embodiments, a user, such as user 100, may be driving the vehicle, may be a passenger in the vehicle, or may provide input to a system that drives the vehicle. A user device, such as user device 104, may be coupled to a user or a part of a user's body. For example, user device 104 includes a head-mounted display coupled to the head of user 100. A user device, such as user device 104, may be part of an inertial measurement system, such as system 106, that determines relative motion of a part of the user's body to which the user device is coupled relative to a reference frame in which the user is riding. For example, user device 104 may be a head-mounted display and inertial measurement system 106 that includes user device 104 may be configured to determine relative motion of user 100's head relative to an inertial reference of vehicle 102 in which user 100 is riding.

In order to determine relative motion of a part of a user's body to which a user device is coupled, an inertial measurement system, such as system 106, may include one or more processors that receive inertial measurements from an inertial measurement device, such as inertial measurement device 108, and that receive inertial measurements from an additional inertial measurement device, such as inertial measurement device 110. One of the inertial measurement devices may be mechanically coupled to a user device that couples with a part of the body of the user. For example, inertial measurement device 108 is mechanically coupled to user device 104 that is a head-mounted display coupled to user 100's head and that is configured to move with user 100's head as user 100 moves their head.

In addition, an inertial measurement system, such as system 106, may include an additional inertial measurement device, such as inertial measurement device 110, coupled to a non-fixed reference frame, such as vehicle 102. The additional measurement device may move with the non-fixed reference frame (e.g. vehicle 102) and may measure the inertial motion of the non-fixed reference frame (e.g. vehicle 102) without including in the device's measurements motion of the part of the user's body to which the user device that includes the first inertial measurement device is attached. For example, the inertial measurements of inertial measurement device 110 may measure motion of vehicle 102 without including motion of user 100's head in the device's measurements.

An inertial measurement system, such as system 106, may also include one or more processors, such as processors 112, that are configured to receive inertial measurements from multiple inertial measurement devices. For example, processors 112 receive inertial measurements 114 from inertial measurement device 108 and receive inertial measurements 116 from inertial measurement device 110. In some embodiments, processors, such as processors 112, may be included in a user device, such as user device 104, or may be included in a system that communicates with an inertial measurement device, such as inertial measurement device 108, included in a user device, such as user device 104. For example, in some embodiments, processors 112 may be separate from user device 104 and may be a built-in component of vehicle 102 or may be included in user device 104.

In order to determine relative motion of a body part of a user to which a user device is coupled, the one or more processors of an inertial measurement system, such as processors 112 of system 106, may determine differences between inertial measurements measured by an inertial measurement device that moves with a part of a user's body that is riding in a vehicle and inertial measurements measured by an additional inertial measurement device that is coupled to the vehicle in which the user is riding and that does not move with the part of the body of the user to which the user device is coupled.

In some embodiments, the additional inertial measurement device that does not move with the part of the body of the user to which the user device is coupled may be a built-in component of the vehicle or may be a separate component separate from the user device and may be configured to be coupled to the vehicle. Further, in some embodiments, the additional inertial measurement device that does not move with the part of the body of the user to which the user device is coupled may be a portable multipurpose computing device such as a phone, tablet, laptop or other portable computing device. For example in FIG. 1, inertial measurement device 110 is included in portable multi-purpose computing device 118. In some embodiments, portable multi-purpose computing device 118 may be a portable multi-purpose computing device, such as a mobile phone, stowed in a pocket of user 100. In such embodiments, portable multi-purpose computing device 118 may move with vehicle 102 without moving when user 100's head moves. Thus, inertial measurement device 110 may provide inertial measurements that correspond to movement of a non-fixed inertial reference frame represented by vehicle 102 without including measurements of the user's motion within the non-fixed inertial reference frame (e.g. the movement of user 100's head). The one or more processors may be configured to subtract relative motion of a non-fixed inertial reference frame from an overall inertial measurement that includes both motion of vehicle 102 and motion of user 100's head within vehicle 102 to determine relative motion of user 100's head relative to a non-fixed reference frame (e.g. relative to vehicle 102). In some embodiments, inertial measurements may include vector components measurements (e.g. X, Y, and Z components). Also, in some embodiments, inertial measurements may include angular motion measurements around multiple axis (e.g. angular motion about X, Y, and Z axis). The one or more processors may subtract inertial measurements that include multi-component measurements and multi-angular motion measurements to determine relative inertial motion. In some embodiments, various other coordinate systems may be used, such as polar coordinates or other suitable coordinate systems.

Figure 2A:
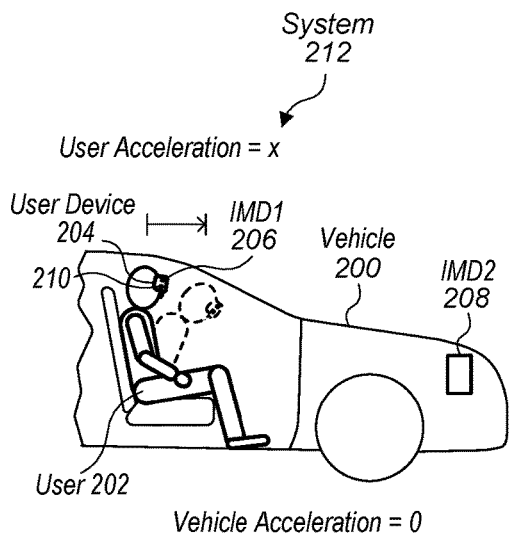
FIGS. 2A-2C illustrate examples of relative motion of a user relative to a vehicle reference frame, according to some embodiments.
Figure 2B:
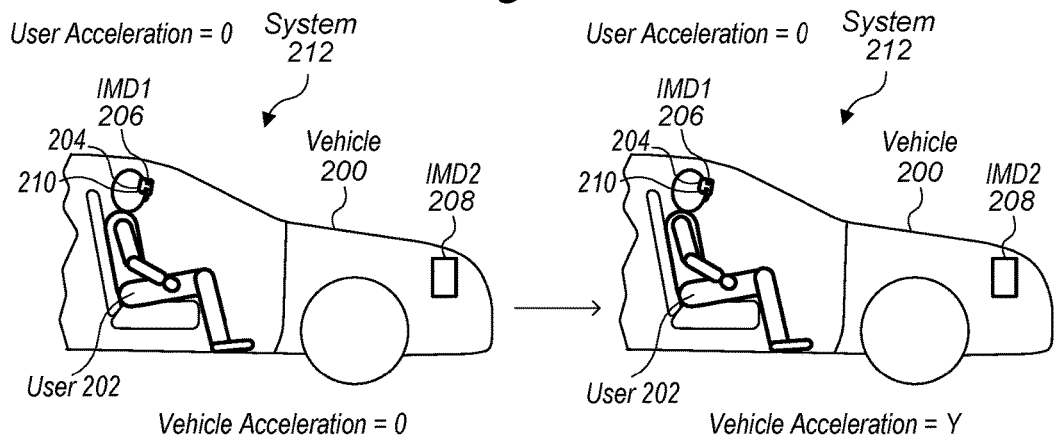
Figure 2C:
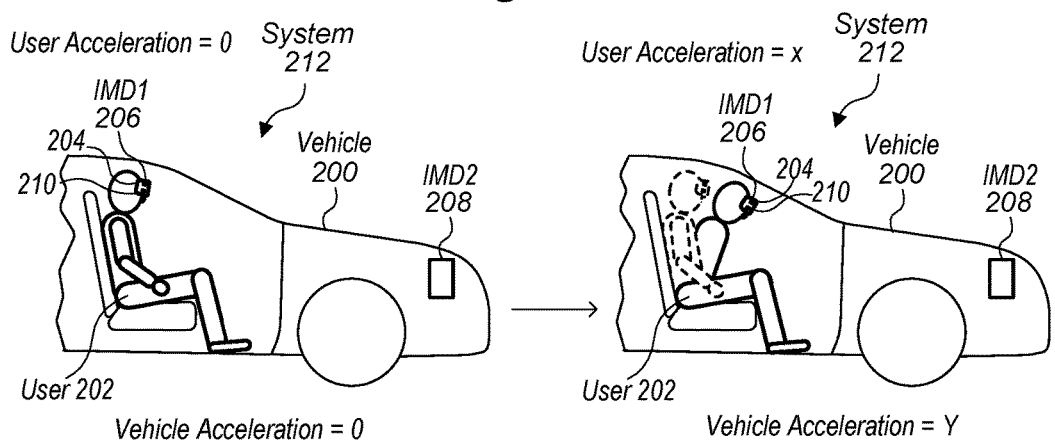

FIGS. 2A-2C illustrate examples of relative motion of a user relative to a vehicle reference frame, according to some embodiments.

In FIGS. 2A-2C a user 202 is seated in a vehicle 200. Vehicle 200 is illustrated as an automobile but in some embodiments may be various other types of non-fixed reference frames, such as other types of vehicles or modes of transportation. User 202 is wearing user device 204, which is a head-mounted display that includes an inertial measurement device 206. In addition, vehicle 200 includes an additional inertial measurement device 208 built into vehicle 200. In some embodiments, additional inertial measurement device 208 may be a portable device carried by user 202 and coupled with vehicle 200. In some embodiments, additional inertial measurement device 208 may be a multi-purpose portable electronic device carried by user 202 that is carried in such a way that the multi-purpose portable electronic device does not move with user 202's head, or may be another type of device that includes an inertial measurement device and that is configured to move with vehicle 200 without moving with user 202's head. In some embodiments, user device 204 may be other types of user devices such as gaming controllers, non-head mounted displays, control interfaces for vehicle entertainment and comfort controls, etc.

In some embodiments, a system 212 implementing relative inertial motion measurement technology may include one or more processors 210 included in user device 204, separate from user device 204 but included in vehicle 200, or included in a separate device separate from user device 204. In addition system 212 includes inertial measurement device 206 and additional inertial measurement device 208. The one or more processors 210 may be configured to receive inertial measurements from inertial measurement devices 206 and 208 in order to determine relative motion of user device 204 or the part of user 202's body to which user device 204 is coupled.

In FIG. 2A, vehicle 200 is at a stop and remains stopped. User 202 is seated in vehicle 200 and moves his head forward. Note that the movement of user 202's head is exaggerated in FIG. 2A for clarity of illustration. In some embodiments, movement of user 202's head may be more or less than illustrated in FIG. 2A. Because vehicle 200 is stopped and remains stopped, the reference frame of vehicle 200 remains fixed during the motion of user 202's head. Thus, the one or more processors 210 of system 212 determine the relative motion of user device 204 relative to the reference frame of vehicle 200 to be equivalent to the inertial measurements received from inertial measurement device 206. This is because vehicle 200 is not in motion and inertial measurements from additional inertial measurement device 208 indicate no motion of vehicle 200.

In FIG. 2B, user 202 is seated in vehicle 200 and remains still in vehicle 200, i.e. user 202 does not appreciably move user 202's head. At the same time, vehicle 200 accelerates from a stopped position (e.g. no acceleration or velocity) to a moving state (e.g. acceleration=Y). Inertial measurement device 206 measures the inertial movement of user 202's head, which in this case includes the acceleration of vehicle 200 (acceleration=Y). However, because user 202 remains still and does not appreciably move user 202's head there is not additional inertial movement of user 202's head beyond the movement of vehicle 200. Also, additional inertial measurement device 208 measures the inertial movement of vehicle 200 (acceleration=Y). In order to determine the relative movement of user device 204 and user 202's head to which user device 204 is coupled the one or more processors 210 of system 212 subtract the inertial measurements received from additional inertial measurement device 208 from the inertial measurements received from inertial measurement device 206. For example, the one or more processors 210 subtract acceleration Y measured by additional inertial measurement device 208 from acceleration Y measured by inertial measurement device 206 to determine that the inertial motion of user device 204 and user 202's head is zero when measured against the non-fixed reference frame of vehicle 200. Note that in the examples in FIGS. 2A-2C inertial measurements have been simplified for purpose of illustration. In actual practice it is likely that user 202's head would move at least some amount while vehicle 200 is accelerating. Furthermore, in some embodiments, the one or more processors 210 may further include a fudge factor when determining relative motion of user 202's head due to natural responses to changes in movement that are not conscious movements by user 202. For example, when vehicle 200 accelerates, user 202 may slightly move due to the motion of the vehicle without consciously attempting to move user 202's head. For example, cushions in seats in vehicle 200 may slightly compress due to forces resulting from the acceleration of vehicle 200, or user 202's body may sway with the motion of vehicle 200 despite user 202 looking in a particular direction without consciously changing the direction in which user 202 is looking. A fudge factor may be used by the one or more processors 210 to account for these slight non-conscious movements of user 202 to provide a more stable viewing experience.

In FIG. 2C, user 202 is seated in vehicle 200 and moves his head forward. At the same time, vehicle 200 accelerates from a stopped position (e.g. no acceleration or velocity) to a moving state (e.g. acceleration=Y). Thus in FIG. 2C there is both motion of vehicle 200 and motion of user device 204 and user 202's head within the non-fixed reference frame of vehicle 200. Additional inertial measurement device 208 measures the acceleration of vehicle 200 (acceleration=Y). Inertial measurement device 206 measures the acceleration of vehicle 200 (because user 202 moves with vehicle 200) and also measures the acceleration of user 202's head within vehicle 200. Thus inertial measurement device 206 measures acceleration Y plus the acceleration of user 202's head in addition to the acceleration of vehicle 200. In order to determine the relative motion of user device 204 and user 202's head to which user device 204 is coupled, the one or more processors subtract the inertial measurements from additional inertial measurement device 208 from the inertial measurements from inertial measurement device 206 (e.g. (acceleration Y+head acceleration)−(acceleration Y)). The difference between the inertial measurements from inertial measurement devices 206 and 208 indicate the relative motion of user device 204 (and user 202's head) within the reference frame of vehicle 200. In some embodiments, inertial measurements may comprise more complex measurements of motion, e.g. inertial measurements may include motion in the X, Y, and/or Z direction along with angular motion about the X, Y, and/or Z axis.

Figure 3A:
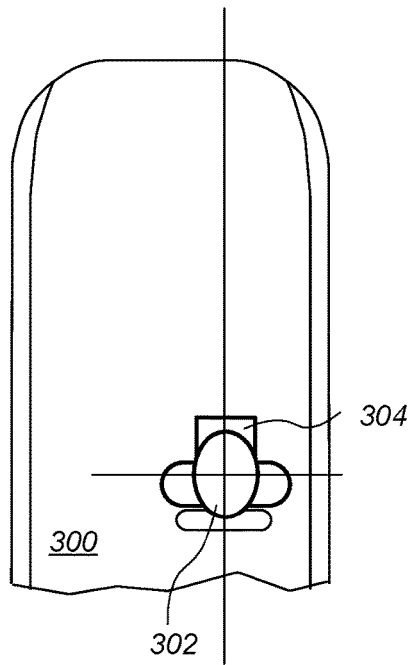
FIGS. 3A-3C illustrate examples of relative angular motion of a user relative to a vehicle reference frame, according to some embodiments.
Figure 3B:
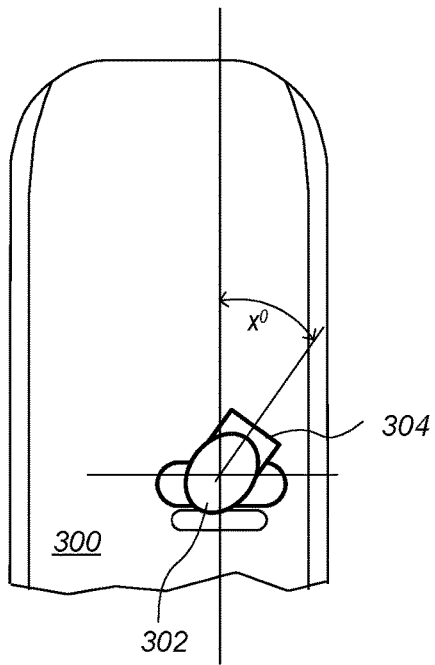
Figure 3C:
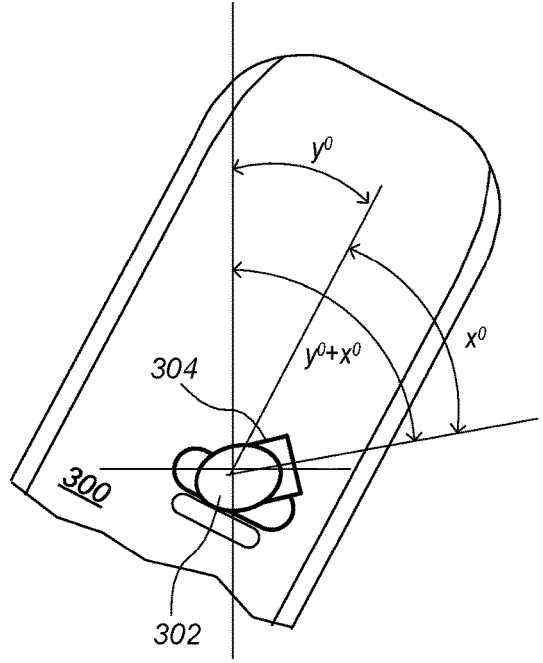

FIGS. 3A-3C illustrate examples of relative angular motion of a user relative to a vehicle reference frame, according to some embodiments. FIG. 3A illustrates angular motion about a Z-axis. However, a system or user device that implements relative inertial measurement technology may determine relative angular motion about other axis, such as the X-axis or Y-axis in a Cartesian coordinate system. User device 304 illustrated in FIGS. 3A-3C may be the same as user device 304 illustrated in FIG. 2 and may include processors 210 and inertial measurement device 206. Likewise vehicle 300 may be the same as vehicle 200 illustrated in FIG. 2 and include additional inertial measurement device 208. Collectively user device 304 and inertial measurement device 208 of vehicle 300 may form a system such as system 212 illustrated in FIG. 2. In FIG. 3A, user 302 is located in vehicle 300 and is facing forward in vehicle 300. In FIG. 3B, user 302 rotates user 302's head about the Z-axis X°. Inertial measurement device 206 included in user device 304 measures angular motion of X°. In the case of FIG. 3B, vehicle 300 does not rotate, thus processors 210 of user device 304 may determine that the relative movement of user device 304 and user 302's head is X° relative to the non-fixed reference frame of vehicle 300. In FIG. 3C, user 302 rotates user 302's head about the Z-axis X°. In addition, vehicle 300 rotates Y° about the Z-axis. Thus, inertial measurement device 206 included in user device 304 measures angular motion of X°+Y°. Also, additional inertial measurement device 208 of vehicle 300 measures angular motion of vehicle 300 of Y° about the Z-axis. In order to determine relative motion of user device 304 and user 302's head, one or more processors 210 of user device 304 may subtract the inertial measurements from additional inertial measurement device 208 of vehicle 300 from the inertial measurements from inertial measurement device 206 of user device 304. For example, one or more processors 210 may determine the angular motion of user device 304 and user 302's head about the Z-axis is X° by subtracting Y° measured by additional inertial measurement device 208 of vehicle 300 from the measured X°+Y° measured by inertial measurement device 206 of user device 304.

An inertial measurement device, which in some embodiments may be a commodity inertial measurement unit, may include microelectromechanical gyroscopes and accelerometers (MEMS accelerometers and gyroscopes). The accelerometers and gyroscopes may track acceleration of an object mechanically coupled to the inertial measurement device with 6 degrees of freedom, for example 3 rotational degrees of freedom (angular motion) and 3 translation degrees of freedom (for example, translation in the X, Y, and Z directions). An inertial measurement device may perform measurements in the 6 degrees of freedom at high frequencies, such as frequencies greater than 100 hertz. In some embodiments, an inertial measurement device may perform measurements in the 6 degrees of freedom at frequencies of approximately 1,000 hertz. High frequency measurements and processing of the measurements when used with a user device that includes a head-mounted display may make an image displayed via the head-mounted display appear to be stuck to the head of the user as occurs in the real world. For example, if the user tilts the user's head left to right, the horizon and ground may stay "horizontal" and not appear to be tilted with the user's head. Also, a user may look around by rotating the user's head left to right and the virtual world displayed via the head-mounted display may appear to the user to stay still as the user rotates the user's head.

Figure 4A:
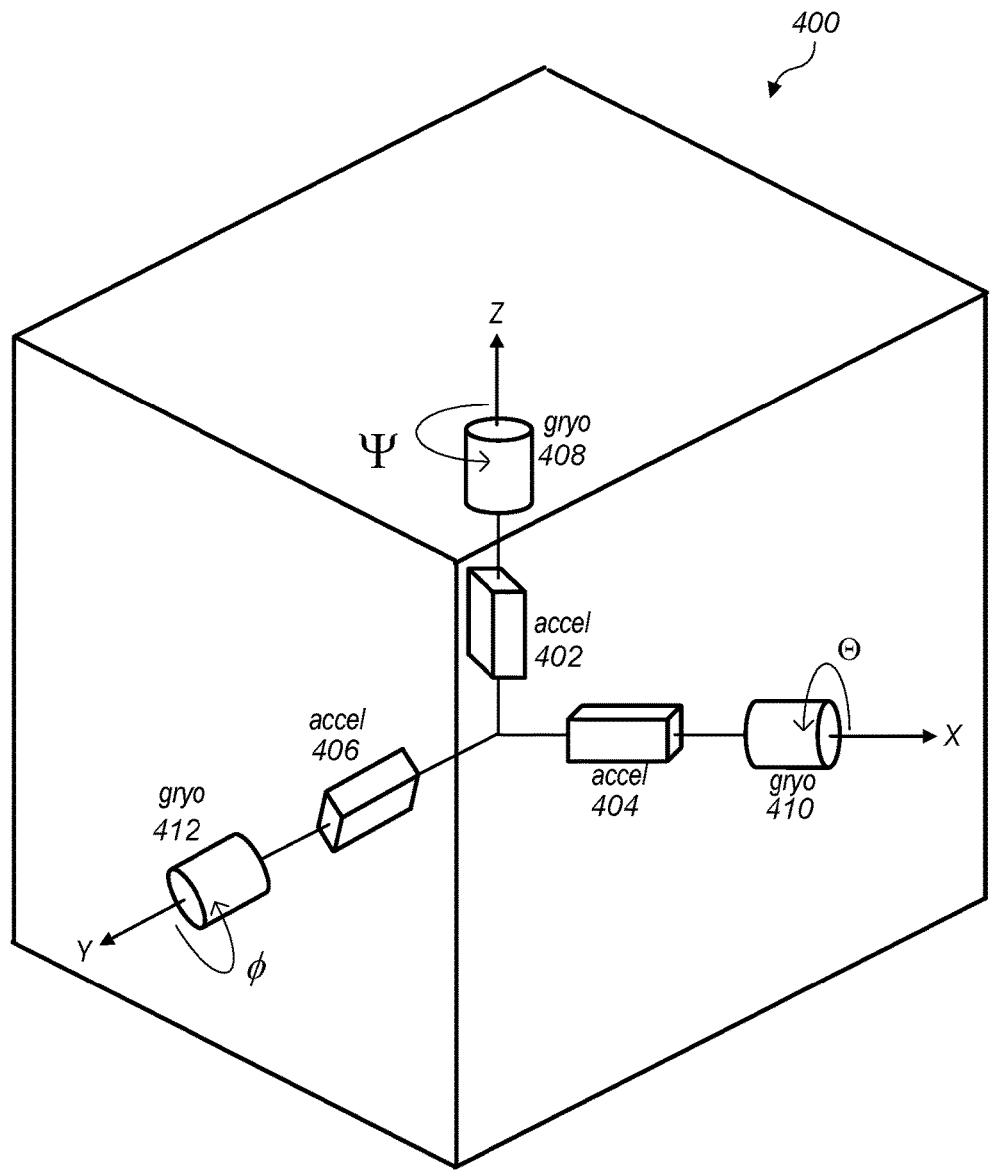
FIG. 4A illustrates a block diagram of an example inertial measurement device, according to some embodiments.

FIG. 4A illustrates a block diagram of an example inertial measurement device, according to some embodiments. Inertial measurement device 400 includes accelerometer 402 aligned with a Z-axis and configured to measure acceleration in the Z-direction, accelerometer 404 aligned with a X-axis and configured to measure acceleration in the X-direction, and accelerometer 406 aligned with a Y-axis and configured to measure acceleration in the Y-direction. Inertial measurement device 400 also includes gyroscope 408 configured to measure angular motion ($\psi$) about the Z-axis, gyroscope 410 configured to measure angular motion ($\theta$) about the X-axis, and gyroscope 412 configured to measure angular motion (φ) about the Y-axis. In some embodiments, an inertial measurement device, such as inertial measurement device 400 may include additional sensors such as magnetometers, pressure sensors, temperature sensors, etc. The accelerometers and gyroscopes of an inertial measurement device, such as accelerometers 402, 404, and 406, and gyroscopes 408, 410, and 412, may measure both translation motion and angular motion in multiple directions and about multiple axis. Such measurements may be used by one or more processors to determine motion of an object mechanically coupled to an inertial measurement device in three-dimensional space.

Figure 4B:
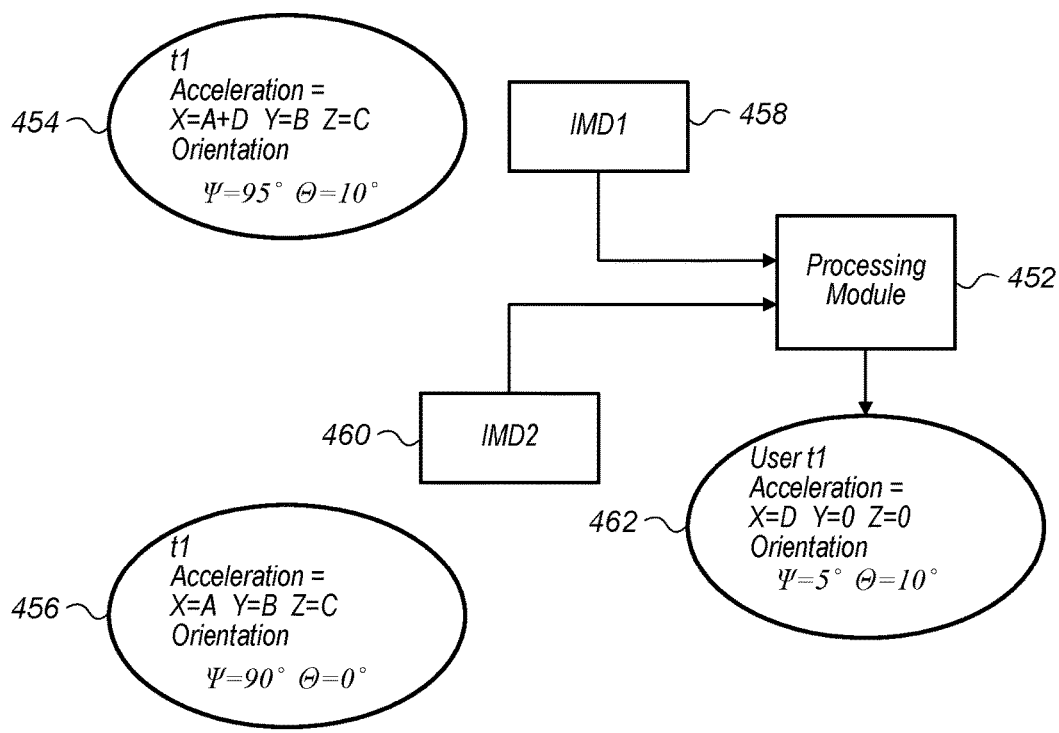
FIG. 4B is a logical block diagram of a relative inertial measurement system, according to some embodiments.

FIG. 4B is logical block diagram of a relative inertial measurement system, according to some embodiments. Processing module 452 may be implemented on one or more processors such as the one or more processors 112 of inertial measurement system 106. Processing module 452 receives inertial measurements 454 and 456 from inertial measurement devices 458 and 460. Inertial measurement device 458 may be an inertial measurement device such as inertial measurement device 110 illustrated in FIG. 1 or additional inertial measurement device 208 illustrated in FIG. 2. Inertial measurement device 458 may move with a vehicle and measure motion of the vehicle without measuring motion of a user device that moves within the vehicle. Inertial measurement device 460 may be an inertial measurement device such as inertial measurement device 108 illustrated in FIG. 1 or inertial measurement device 206 illustrated in FIG. 2. Inertial measurement device 460 may be mechanically coupled to a user device that is coupled to a body part of a user that rides in a vehicle and measures motion of the body part of the user and the motion of the vehicle in which the user is riding.

For a given time interval, processing module 452 may subtract inertial measurements of the non-fixed reference frame (e.g. inertial measurements 454) from overall inertial measurements of the user device (e.g. inertial measurements 456) to determine relative inertial motion of the user device relative to the non-fixed reference frame (e.g. relative movements 462) for the given time interval.

Figure 5:
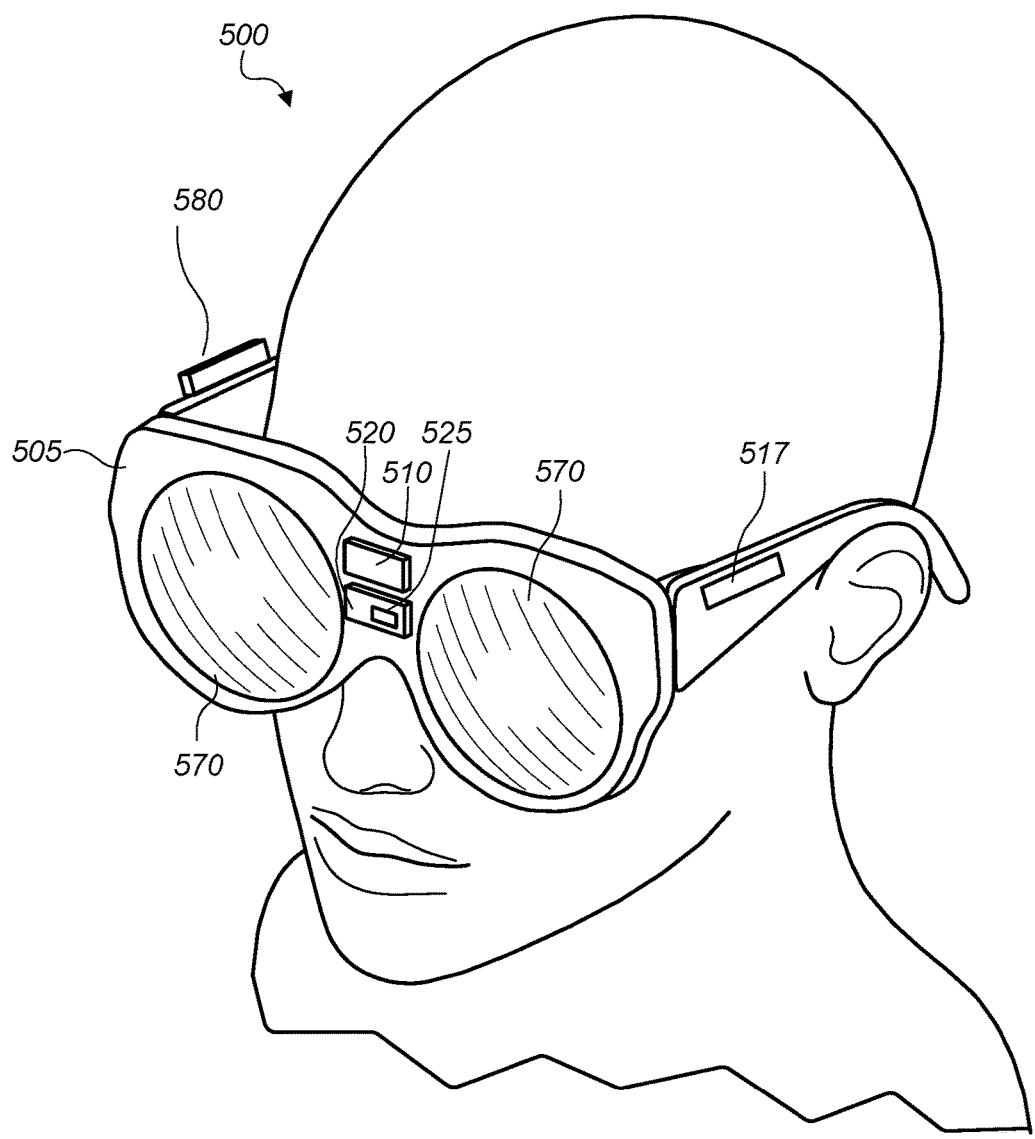
FIG. 5 illustrates an example of a head mounted user device configured to determine relative inertial motion, according to some embodiments.

FIG. 5 illustrates one example embodiment of a head-mounted user device, as described herein. The system illustrated in FIG. 5 represents only one possible embodiment of a user device as described herein and many other configurations are possible, according to various embodiments. As shown in FIG. 5, system 500 may comprise a frame 505 configured to hold various element or components of system 500. For instance, frame 505 may include one or more displays 570 via which system 500 may display (e.g., render) views to the user. Frame 505 may also hold, enclose, or comprise motion tracking module(s) 580. Motion tracking module(s) 580 may be an inertial measurement device, such as inertial measurement device 400 illustrated in FIG. 4B, or inertial measurement devices 108 and 206 illustrated in FIGS. 1 and 2.

In different embodiments, system 500 may include any of various types of devices including, but not limited to: a personal computer system; a laptop computer; a notebook, tablet, slate, or netbook computer; a handheld computer; a mobile device, such as a mobile phone, tablet device, or music player; a video game console; a handheld video game device; or in general any type of computing or electronic device that includes the functionality of generating images for a virtual reality and/or augmented reality system. In some embodiments, system 500 and/or processor(s) 510 may include more or fewer elements than those shown in FIG. 5.

In various embodiments, processor(s) 510 may be a uniprocessor system including one processor, or a multiprocessor system including several processors (e.g., two, four, eight, or another suitable number). Processor(s) 510 may include central processing units (CPUs) configured to implement any suitable instruction set architecture, and may be configured to execute instructions defined in that instruction set architecture. For example, in various embodiments processor(s) 510 may be general-purpose or embedded processors implementing any of a variety of instruction set architectures (ISAs), such as the x86, PowerPC, SPARC, RISC, or MIPS ISAs, or any other suitable ISA. In multiprocessor systems, each of processor(s) 510 may commonly, but not necessarily, implement the same ISA. Processor(s) 510 may employ any microarchitecture, including scalar, superscalar, pipelined, superpipelined, out of order, in order, speculative, non-speculative, etc., or combinations thereof. Processor(s) 510 may include circuitry to implement microcoding techniques. Processor(s) 510 may include one or more processing cores each configured to execute instructions. Processor(s) 510 may include one or more levels of caches, which may employ any size and any configuration (set associative, direct mapped, etc.).

In the example system 500, memory 520 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 500 in a chip-on-chip configuration, a package-on-package configuration, or a multi-chip module configuration. In some embodiments, system memory 520 may store pixel data or other image data or statistics in various formats. Similarly, while the example system 500 includes, according to one embodiment, persistent storage for non-volatile storage of image data or other data used in the system, in other embodiments, the system may include other types of non-volatile memory (e.g. read-only memory (ROM)) for those purposes. In some embodiments, memory 520 may include data, such as program instructions 525.

Processor(s) 510 may include a graphics processing unit (GPU), which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. The amount of hardware and software implementation may vary from embodiment to embodiment.

I/O devices 517 may include any desired circuitry, depending on the type of system 500. For example, in some embodiments, system 500 may be configured to interface with a separate device comprising an inertial measurement device, such as a mobile computing device (e.g. personal digital assistant (PDA), tablet device, smart phone, etc.), and the I/O devices 517 may include devices for various types of wireless communication, such as WiFi, Bluetooth, cellular, global positioning system, etc. In some embodiments, I/O devices 517 may also include additional storage, including RAM storage, solid state storage, or disk storage. In some embodiments, I/O devices 517 may include user interface devices such as additional display devices, including touch display screens or multi-touch display screens, power buttons, input buttons, control keys, keyboards, keypads, touchpads, scanning devices, voice or optical recognition devices, microphones, speakers, scanners, printing devices, or any other devices suitable for entering or accessing data by, or within, system 500.

In some embodiments, processor(s) 510 may include an image signal processor (ISP), which may include dedicated hardware that may facilitate the performance of various stages of an image processing pipeline. In some embodiments, processor(s) 510 and/or an ISP may be configured to receive image data from an external source and/or from one or more data files stored in memory 520 and to process the data into a form that is usable by other components of system 500 (including, but limited to, program instructions 525, and/or I/O devices 517). In some embodiments, processor(s) 510 and/or an ISP may be configured to perform various image procession and manipulation operations including one or more of, but not limited to, image translation operations, horizontal and vertical scaling, non-uniformity correction, filtering, non-uniformity reduction, color space conversion or other non-warping image editing operations, or image stabilization transformations.

Those skilled in the art will appreciate that system 500 is merely illustrative and is not intended to limit the scope of embodiments. For example, system 500 may also be connected to other devices that are not illustrated such as an addition device comprising an additional inertial measurement device. In addition, the functionality provided by the illustrated components may in some embodiments be combined in fewer components or distributed in additional components. Similarly, in some embodiments, the functionality of some of the illustrated components may not be provided or additional functionality may be available. In some embodiments program instructions 525 (e.g., stored in memory 520) may be executed by processor(s) 510 to provide various functions of system 500.

In some embodiments, various functions may be performed by software components executing in memory on another device and communicating with the illustrated system via inter-computer (or inter-device) communication. Some or all of these software components or any data structures described herein may be stored (e.g., as instructions or structured data) in system memory 520, in persistent storage, or may be stored on a non-transitory computer-readable medium or a portable article to be read by an appropriate drive connected to I/O device(s) 517. In some embodiments, instructions stored on a computer-accessible medium separate from system 500 may be transmitted to system 500 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

In some embodiments, processor(s) 510, memory 520, and I/O device(s) 517 may be coupled to a user device as shown in FIG. 5, may be coupled with an inertial measurement device that measures motion of a vehicle, such as inertial measurement device 110 or 208, or may be distributed among multiple physical devices within a relative inertial measurement system such as among a user device such as system 500 and inertial measurement devices such as 110 or 208.

FIGS. 6A-6E illustrate examples of user devices configured to couple with various parts of a user's body and to determine relative inertial motion of the various parts of the user's body, according to some embodiments. User devices 602, 604, 606, 608, and 610 described in FIGS. 6A-6E may comprise the same components as system 500 described above in regard to FIG. 5.

Figure 6A:
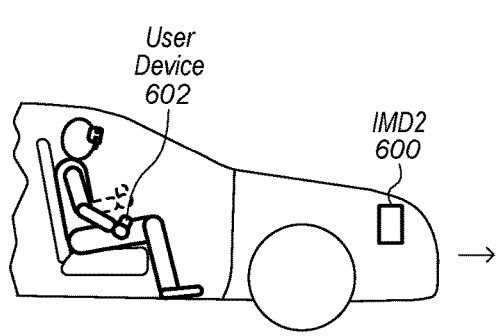
FIGS. 6A-6E illustrate examples of user devices configured to couple with various parts of a user's body and to determine relative inertial motion of the various parts of the user's body, according to some embodiments.
Figure 6B:
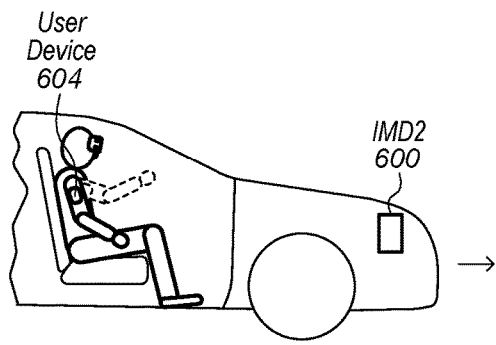
Figure 6C:
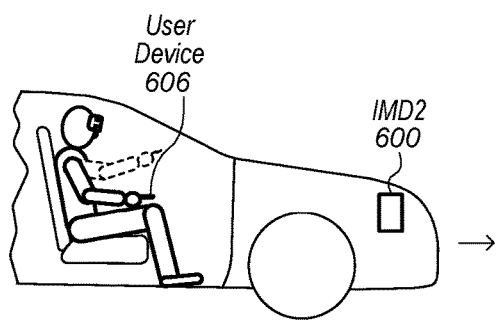
Figure 6D:
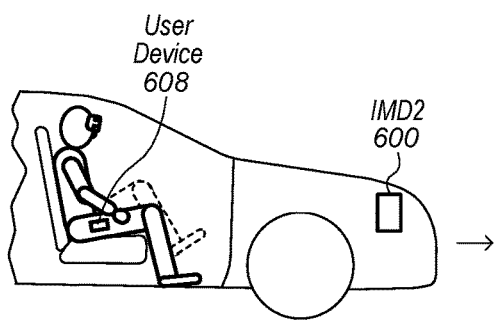
Figure 6E:
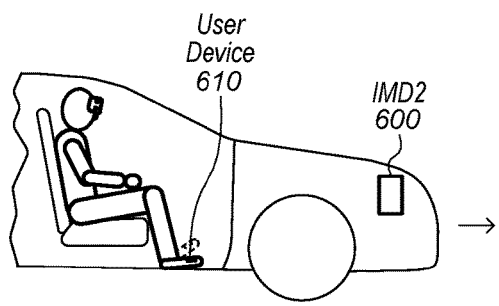

FIG. 6A illustrates an example user device configured to couple with a hand of a user. For example, a user may hold user device 602 and move the device to indicate a desired control action in a game, in relation to a vehicle control, or for another control purpose. User device 602 may be part of an inertial measurement system, such as system 106 illustrated in FIG. 1. One or more processors may receive inertial measurements from inertial measurement devices included in user device 602 and receive inertial measurements from inertial measurement device 600 and determine relative motion of a user's hand that is holding user device 602. In a similar manner, user device 604 is configured to couple with a user's arm and a system that includes user device 604 may determine relative motion of a user's arm. In FIG. 6C, user device 606 is coupled to a user's finger. For example, user device 606 may be a ring. A system that includes user device 606 may determine relative motion of a user's finger in a similar manner as described in regard to user device 602. FIG. 6D illustrates user device 608 configured to couple with a leg of a user. A system including user device 608 may determine relative motion of a user's leg in a similar manner as described in regard to user device 602. FIG. 6E illustrates user device 610 configured to couple with a user's foot. In some embodiments, user device 610 may be included in a shoe or sandal worn by a user. A system including user device 610 may determine relative motion of a user's foot in a similar manner as described in regard to user device 602. In some embodiments, a system may include multiple ones of user devices 602, 604, 606, 608, or 610 along with a head mounted display such as system 500 illustrated in FIG. 5. In some embodiments a system may include a single one of user devices 602, 604, 606, 608, or 610 without including a head mounted display. For example, user devices 602, 604, 606, 608, and/or 610 may be used to control one or more functions in a vehicle. In some embodiments, a vehicle in which a user device, such as user devices 602, 604, 606, 608, and/or 610, is used may be a public transportation vehicle such as a subway, bus, tram, etc. In some embodiments, a public transportation vehicle may include an inertial measurement device and may broadcast inertial measurements of the public transportation vehicle to riders of the public transportation vehicle. Thus user devices, such as such as user devices 602, 604, 606, 608, and/or 610, may determine relative movements relative to the public transportation vehicle based on received inertial measurements broadcast to users of the public transportation vehicle. In some embodiments, a vehicle, such as a public transportation vehicle, may include predictive inertial data in inertial measurements broadcast to riders of the public transportation vehicle. For example, if a subway follows a set path, the subway may broadcast predicative inertial data about an upcoming bend in the track before actually passing through the bend in the track.

Figure 7A:
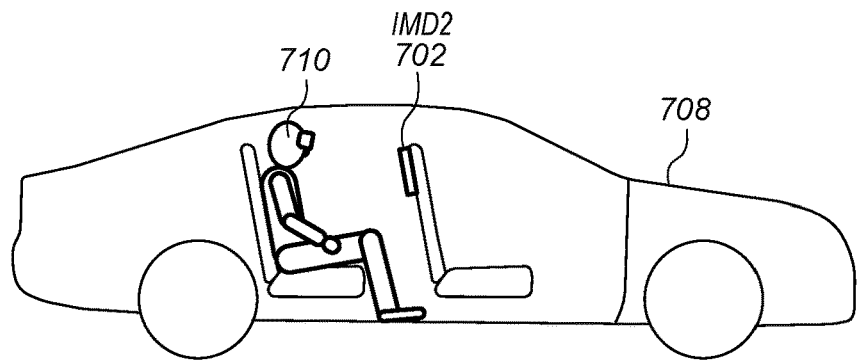
FIGS. 7A-7C illustrate examples of inertial measurement devices configured to measure movement of a vehicle, according to some embodiments.
Figure 7B:
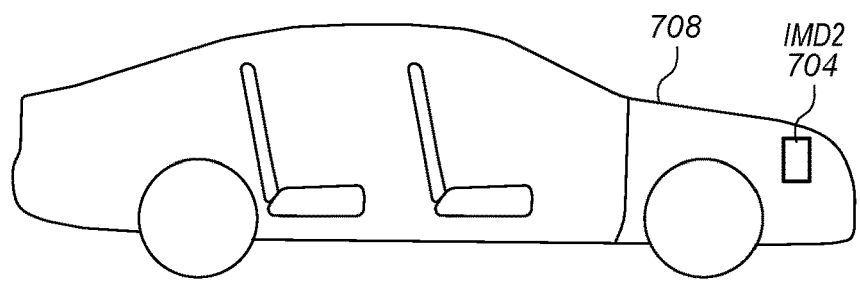
Figure 7C:
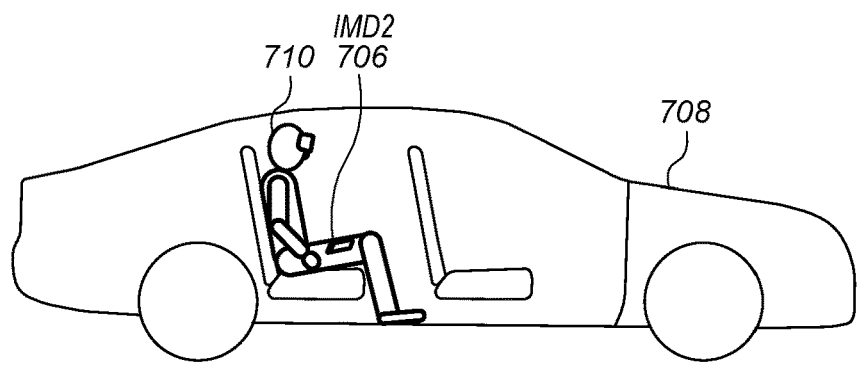

FIGS. 7A-7C illustrate examples of inertial measurement devices configured to measure movement of a vehicle, according to some embodiments. Inertial measurement devices 702, 704, and 706 may be inertial measurement devices such as inertial measurement device 400 illustrated in FIG. 4. Also, inertial measurement devices 110, 208, 460, 600, may be configured similar to inertial measurement devices 702, 704, and 706 illustrated in FIGS. 7A-7C.

In FIG. 7A inertial measurement device 702 is a separate device configured to couple with a vehicle and move with the vehicle without moving with a user or part of a user's body that is riding in the vehicle. For example, inertial measurement device 702 may be included in a set purchased by a user 710 and the user 710 may mount inertial measurement device 702 to a vehicle 708 by strapping the device to the vehicle 708, using Velcro to couple the device 702 to a vehicle 708, using magnets, clamps, or suction cups to couple the device 702 to a vehicle 708 or may couple the device 702 to a vehicle 708 via other means. In some embodiments, an inertial measurement device, such as inertial measurement device 704, may be built into a vehicle, such as vehicle 708. For example an inertial measurement device may part of another vehicle system such as a traction control or stability control system. In some embodiments, a vehicle may include an inertial measurement device, such as inertial measurement device 704 illustrated in FIG. 7B, that is particularly configured to provide reference inertial measurements to a system such as a head-mounted display system or a controller system. In some embodiments, an inertial measurement device, such as inertial measurement device 706 illustrated in FIG. 7C, may be included in a device commonly carried by a user. For example, inertial measurement device 706 may be included in a multi-functional portable electronic device, such as a phone, tablet, laptop, watch, etc. that is commonly carried by a user 710. The multi-functional portable electronic device may be secured in the user's pocket, in a bag carried, by the user, or via other means such that the multi-functional portable electronic device moves with a vehicle in which the user is riding, but does not move with a part of the user's body to which a user device is coupled that measures the movement of that part of the user's body. For example, a phone in a user's pocket may move with a vehicle in which the user is riding, but may not move with a users' head when the user wears a head-mounted display.

Figure 8:
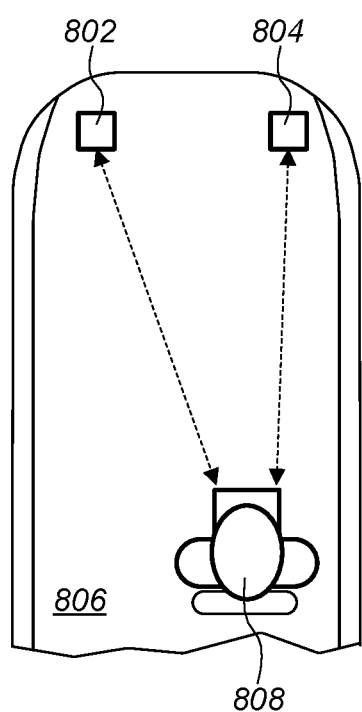
FIG. 8 is a top view of a vehicle that includes fixed reference points used in determining relative inertial motion, according to some embodiments.

FIG. 8 is a top view of a vehicle that includes fixed reference points used in determining relative inertial motion, according to some embodiments.

In order to prevent drift due to small errors in inertial measurements, a tracking system that utilizes fixed reference points may be used by a system that determines relative inertial motion. For example, small errors between a first and second inertial measurement device may add up over time to give the effect that the user is slowly floating in a particular direction despite remaining seated in a vehicle. In some embodiments, a camera on a user device such as a head mounted display may be configured to identify a fixed reference point in a reference frame, such as a fixed point in an interior of a vehicle. The camera may be able to run a localization algorithm that uses the reference point to track movement in space (this is sometimes referred to as simultaneous localization and mapping (SLAM)). In some embodiments, an inertial measurement device may perform inertial measurements at a higher frequency than a tracking system performs tracking measurements. Thus, inertial measurements from an inertial measurement device may be primarily used by a processing system to determine movement of a user device, user, or part of user's body and may be corrected at given intervals based on tracking data. In some embodiments, other tracking system may be used such as emitters at fixed locations in an interior of a vehicle and sensors on a user device that can detect signals from the emitters and determine a position of a user device within an interior of a vehicle based on the emitted signals.

FIG. 8 is a top view of a vehicle that includes fixed reference points used in determining relative inertial motion, according to some embodiments. Vehicle 806 includes fixed references 802 and 804, as described above, a user device, such as user device 808 may utilize references 802 and 804 to determine a location of user device 808 within vehicle 806 and to correct for drift resulting from errors in inertial measurements from inertial measurement devices. In some embodiments, a vehicle, such as vehicle 806 may be employing a tracking system to reduce drift for other system of the vehicle. For example, a GPS system may be used by the vehicle to correct for drift. In such embodiments, tracking data used by the vehicle may be transmitted to a user device for use by the user device to correct for drift. In some embodiments, a vehicle may use light detection and ranging or cameras to correct for drift and this tracking data may be communicated to a user device operating within the vehicle.

Figure 9A:
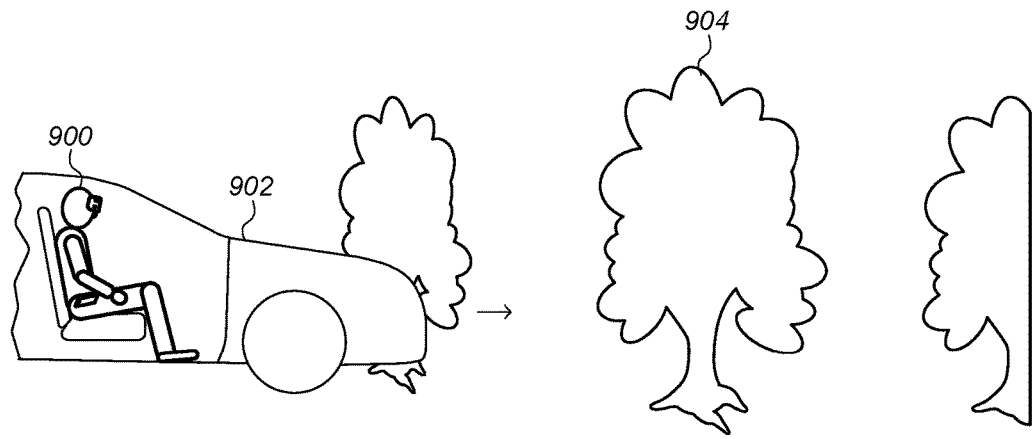
FIG. 9A illustrates a vehicle in which a user is travelling through a terrain, according to some embodiments.
Figure 9B:
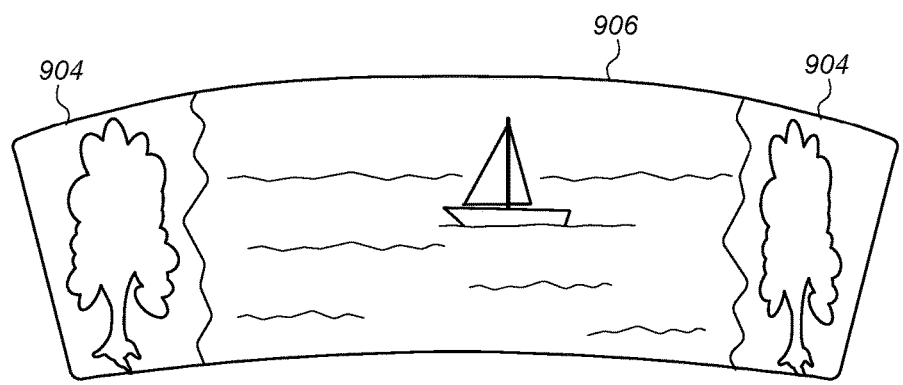
FIG. 9B illustrates a scene displayed to a user riding in a vehicle that travels through a terrain at a first speed, according to some embodiments.
Figure 9C:
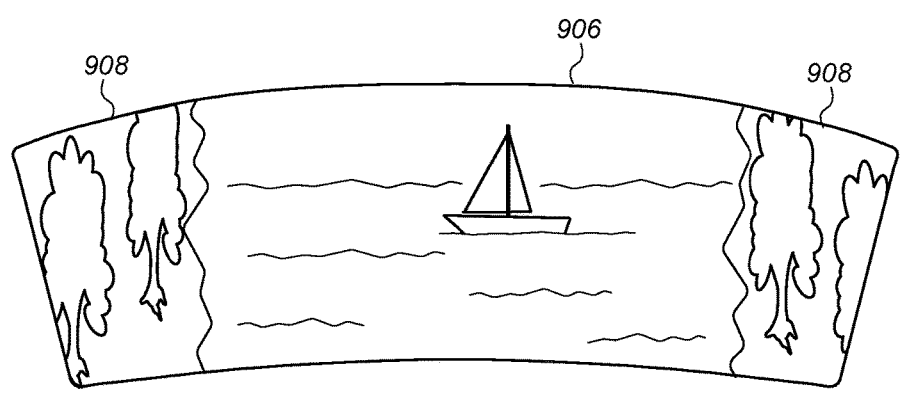
FIG. 9C illustrates a scene displayed to a user riding in a vehicle that travels through a terrain at a second speed, according to some embodiments.

FIG. 9A illustrates a vehicle in which a user is travelling through a terrain, according to some embodiments. Vehicle 900 travels through a terrain that includes trees 904. In some embodiments, a user device that includes a display, such as user device 900, may display in a portion of a view images that indicate motion of vehicle 900 through a terrain. For example, view 906 includes trees 904 displayed in the periphery of view 906. In some embodiments, actual images of a terrain through which a vehicle is travelling may be displayed in a view, such as view 906. However, in some embodiments images may be displayed to simulate motion, but may not necessarily correspond with a terrain through which a vehicle is travelling. For example, in some embodiments, lines may pass in a periphery of a view where the lines pass in proportion to a speed of the vehicle but do not necessarily represent the terrain through which the vehicle is travelling. In other embodiments, stored images may be shown in a periphery of a view and may pass in the view proportional to a speed of travel of the vehicle. For example, vehicle 902 may be passing through a city terrain (instead of the terrain illustrated in FIG. 9A). However, images of trees may be shown in the periphery of view 906 to indicate relative speed of the vehicle. For example, in FIG. 9A a single tree is shown in the periphery of view 906, whereas in FIG. 9B two trees 908 are shown in the periphery of view 906. This may indicate that vehicle 902 is travelling roughly twice as fast in FIG. 9C as compared to FIG. 9B. In addition, in some embodiments, images may pass more quickly on one side of a periphery of a view than on another side of a periphery of a view to indicate turning. Including images in a view that correlate to the terrain or that indicate speed of the vehicle may improve comfort of a user wearing a head-mounted display while travelling in a vehicle and may reduce symptoms of sickness or nausea.

In some embodiments, a relative inertial measurement system may time synchronize inertial measurements from multiple inertial measurement devices as part of determining relative motion of a user device or a part of a user's body to which the user device is coupled. In other embodiments, a relative inertial measurement system may utilize the most recently received inertial measurements (even if not measured in a same time interval) to determine relative motion of a user device or a part of a user's body to which the user device is coupled.

Figure 10A:
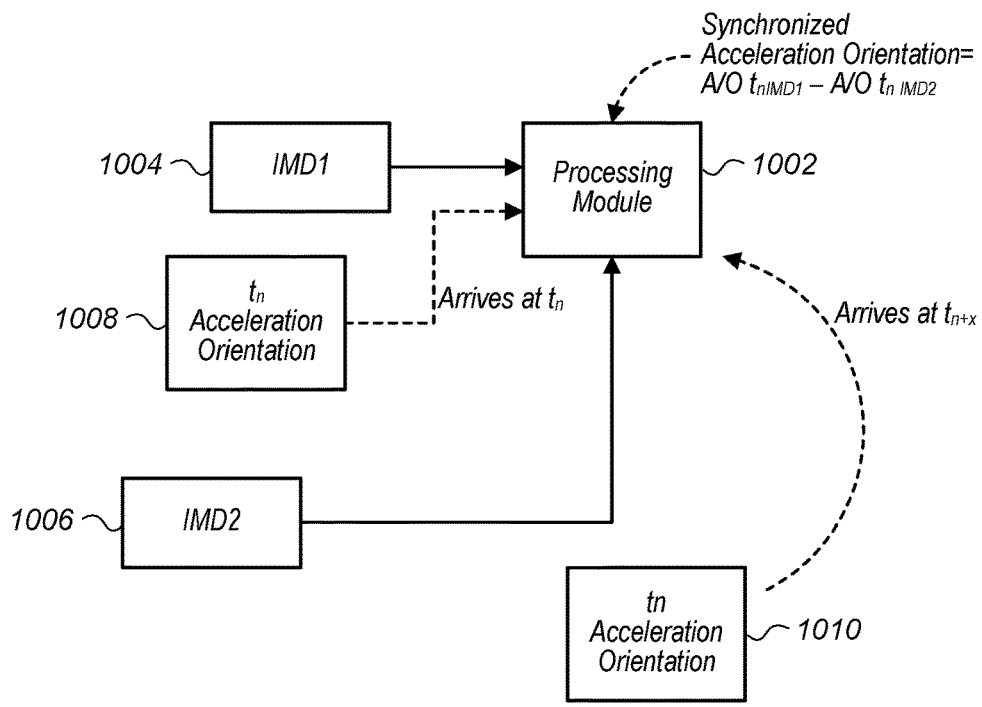
FIG. 10A is a logical block diagram of a relative inertial measurement system that determines relative inertial motion based on time synchronized inertial measurements, according to some embodiments.

FIG. 10A is logical block diagram of a relative inertial measurement system that determines relative inertial motion based on time synchronized inertial measurements, according to some embodiments. In FIG. 10A processing module 1002 synchronizes inertial measurements from inertial measurement devices 1004 and 1006 in order to determine relative motion of a user device. In some situations inertial measurements from one inertial measurement device may be delayed in arriving at a processing module such as processing module 1002. For example, inertial measurements 1010 arrive at processing module 1002 at time $t_{n+x}$ whereas inertial measurements 1008 arrive at processing module 1002 at time $t_n$. In some embodiments that utilize synchronization, processing module may delay processing inertial measurements 1008 until inertial measurements 1010 arrive at processing module 1002 so that relative movement is determined based on inertial measurements measured during a same time interval.

Figure 10B:
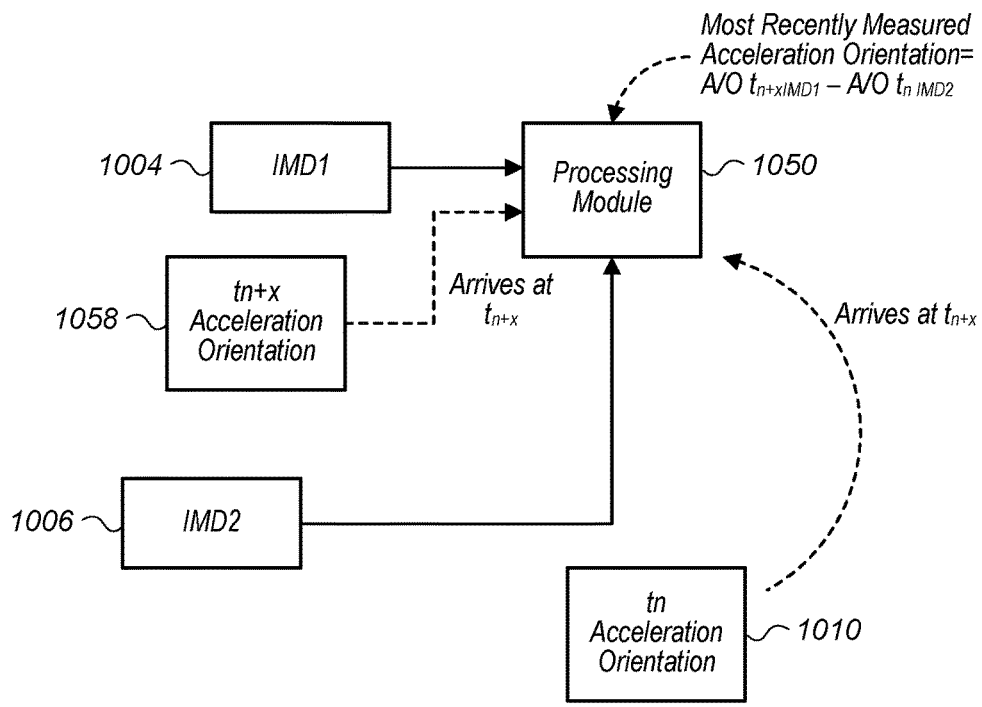
FIG. 10B is a logical block diagram of a relative inertial measurement system that determines relative inertial motion based on the most recently received inertial measurements, according to some embodiments.

However, in other embodiments, most recently received inertial measurements may be used to determine relative movement. For example, FIG. 10B is a logical block diagram of a relative inertial measurement system that determines relative inertial motion based on the most recently received inertial measurements, according to some embodiments. In FIG. 10B processing module 1050 receives inertial measurements 1058 at time interval $t_{n+x}$ where inertial measurements were performed during time interval $t_{n+x}$. Processing module 1050 also receives inertial measurements 1010 at $t_{n+x}$, where inertial measurements 1010 were performed during a previous time interval $t_n$. As opposed to processing module 1002 that synchronizes inertial measurements, processing module 1050 may compare inertial measurements 1058 measures at time $t_{n+x}$ and inertial measurements 101 measured at the previous time interval $t_n$ to determine relative movement. Because inertial measurement devices, such as inertial measurement devices 1004 and 1006 perform inertial measurements at high frequencies, slight inaccuracies due to utilizing non-synchronized inertial measurements may be minimal. Furthermore, omitting a synchronization operation may improve processing speeds of a processing module, such as processing module 1050.

Figure 11:
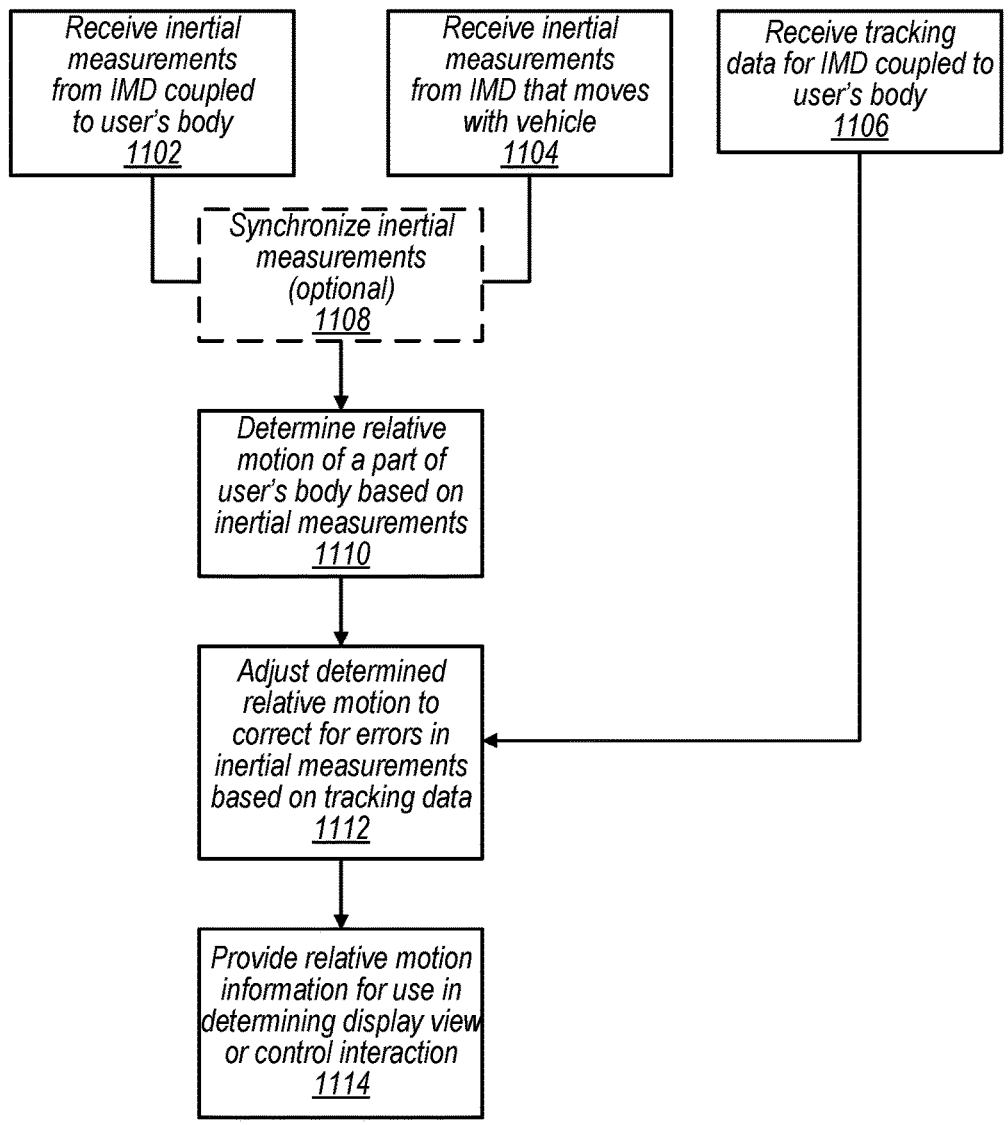
FIG. 11 is a high-level flowchart illustrating a method of operation for a relative inertial measurement system, according to some embodiments.

FIG. 11 is a high-level flowchart illustrating a method of operation for a relative inertial measurement system, according to some embodiments.

At 1102 inertial measurements are received from a first inertial measurement device. The inertial measurement device may be coupled to a user or a part of a user's body and may indicate inertial movement of the user or the part of the user's body. At 1104 inertial measurements are received from a second inertial measurement device that moves with a vehicle in which a user is riding, but does not move with a part of the user's body to which the first inertial measurement device is coupled. At 1106 tracking data for a location of the first inertial measurement device is received. In some embodiments, tracking data may be received at a lower frequency than a frequency at which inertial measurements are received at 1102 and 1104. In some embodiments, step 1106 may be omitted.

At 1108, inertial measurements received at 1102 and 1104 are synchronized based on time intervals in which the inertial measurements were performed. In some embodiments, that include different types of inertial measurement devices, at 1108 inertial measurements may be normalized to account for differences in inertial measurement devices. In some embodiments, 1108 may be omitted.

At 1110, inertial measurements received at 1102 and 1104 are compared to determine relative movement or motion of a user device relative to a non-fixed reference frame such as a vehicle. In some embodiments, inertial motion of a vehicle may be subtracted from overall motion experienced by a user device to determine relative motion of the user device relative to the vehicle. In some embodiments, determining relative motion may comprise comparing and/or subtracting inertial motion measurements in 6 degrees of freedom (e.g. translation in the X, Y, and Z directions, and angular motion about the X, Y, and Z axis).

At 1112, the relative motion measurements may be corrected based on tracking data to account for errors in measurement (e.g. drift). In some embodiments, 1112 may be performed at a lesser frequency than 1110 or may comprise utilizing a constant correction factor that is periodically updated based on tracking data to adjust for errors. In some embodiments, a fudge factor may be applied at 1112 to account for slight motions due to vehicle movement that are not conscious motions by a user using a user device.

In embodiments, that include a head-mounted display, at 1114, the determined and/or adjusted relative motion information determined at 1110 and/or 1112 may be provided for use in determining a display view. In embodiments that include a controller, the determined and/or adjusted relative motion information determined at 1110 and/or 1112 may be provided for use in control.

What is claimed is:

1. A system, comprising:
   a controller device configured to be coupled with a user's head and move with the user's body head as the user indicates a desired control action in relation to a vehicle control of a vehicle in which the user is riding, wherein the controller device is included in a head-mounted device;
   a display coupled with the head-mounted device;
   an inertial measurement device mechanically coupled to or included in the controller device and configured to measure movement of the controller device as the controller device moves with the user's head and as the user's head moves with the vehicle in which the user is riding;
   an additional inertial measurement device configured to move with the vehicle in which the user is riding without moving with the user's head, wherein the additional inertial measurement device is configured to measure movement of the vehicle; and
   one or more processors configured to:
     receive inertial measurements from the inertial measurement device mechanically coupled to or included in the controller device;
     receive inertial measurements from the additional inertial measurement device configured to measure movement of the vehicle;
     determine a relative movement of the controller device relative to a reference frame of the movement of the vehicle, wherein the relative movement of the controller device is determined based on differences between the received inertial measurements from the inertial measurement device and the additional inertial measurement device; and
     determine one or more control actions to be taken by a control system of the vehicle, wherein at least one of the one or more control actions is determined solely based on the determined relative movement of the controller device.

2. The system of claim 1, wherein the control system of the vehicle comprises a comfort control system.

3. The system of claim 2,
wherein the one or more processors are further configured to determine a view to be displayed in the display based on the determined relative movement of the head-mounted device.

4. The system of claim 1, wherein the additional inertial measurement device is included in a separate device separate from the controller device, wherein the separate device is configured to be coupled with the vehicle by the user.

5. The system of claim 1, wherein the additional inertial measurement device is included in a multi-purpose portable electronic device carried by the user.

6. The system of claim 1, wherein the additional inertial measurement device is a built-in component of the vehicle.

7. The system of claim 1, wherein the one or more processors are further configured to receive tracking data for determining a position of the controller device,
wherein the relative movement of the controller device relative to a reference frame of the movement of the vehicle is further determined based on the tracking data.

8. The system of claim 7, wherein the tracking data comprises one or more distances between the controller device and a fixed reference point within the vehicle.

9. The system of claim 1, wherein the additional inertial measurement device is configured to measure movement of the vehicle at a frequency equal to or greater than a frequency at which the inertial measurement device measures movement of the controller device as the controller device moves with the user's head and with the vehicle in which the user is riding.

10. A controller device, comprising:
an inertial measurement device configured to measure movement of the controller device:
as the controller device moves with a user's head to which the controller device is coupled as the user indicates a desired control action in relation to a vehicle control of a vehicle in which the user is riding; and
as the user's head moves with the vehicle in which the user is riding,
wherein the controller device is included in a head-mounted display, and wherein
a display is coupled to the head-mounted device; and
one or more processors configured to:
receive inertial measurements from the inertial measurement device;
receive inertial measurements from an additional inertial measurement device configured to measure movement of the vehicle in which the user is riding, wherein the additional inertial measurement device is configured to move with the vehicle in which the user is riding without moving with the user's head to which the controller device is coupled;
determine relative movement information for the controller device relative to a reference frame of the movement of the vehicle, wherein the relative movement information for the controller device is determined based on differences between the inertial measurements received from the inertial measurement device and the inertial measurements received from the additional inertial measurement device; and
provide the relative movement information to a control system of the vehicle for use in determining one or more control actions to be taken by the control system of the vehicle, wherein at least one of the one or more control actions is determined solely based on the relative movement information.

11. The controller device of claim 10, wherein:
the controller device is a controller for a comfort control system of the vehicle, an entertainment system of the vehicle, or another control system of the vehicle.

12. The controller device of claim 10, wherein:
the head-mounted device is configured to move with the user's head in a direction in which the user is looking; and
the one or more processors are further configured to:
determine a view to be displayed in the display based on the determined relative movement of the head-mounted device; and
include, in a portion of the view to be displayed in the display, an image that corresponds with the movement of the vehicle, wherein the image that corresponds with the movement of the vehicle is determined based, at least in part, on the received inertial measurements from the additional measurement device.

13. The controller device of claim 12, wherein the image that corresponds with the movement of the vehicle comprises a view of an environment through which the vehicle is travelling.

14. The controller device of claim 12, wherein the image that corresponds with the movement of the vehicle appears to the user to move at a speed proportional to the speed of the vehicle.

15. A method, comprising:
receiving inertial measurements from an inertial measurement device coupled with a user's head as the user indicates a desired control action in relation to a vehicle control of a vehicle in which the user is riding, wherein the inertial measurement device is configured to measure movement of the user's head as the user's head moves with the vehicle in which the user is riding, wherein the inertial measurement device is included in a head-mounted device, and wherein a display is coupled to the head-mounted device;
receiving inertial measurements from an additional inertial measurement device configured to measure movement of the vehicle in which the user is riding, wherein the additional inertial measurement device is configured to move with the vehicle in which the user is riding without moving with the user's head to which the inertial measurement device is coupled;
determining a relative movement of the user's head relative to a reference frame of the movement of the vehicle, wherein the relative movement of the user's head is determined based on differences between the inertial measurements received from the inertial measurement device and the inertial measurements received from the additional inertial measurement device; and
determining one or more control actions to be taken by a control system of the vehicle based on the determined relative movement of the user's head relative to a reference frame of the movement of the vehicle, wherein at least one of the one or more control actions is determined solely based on the determined relative movement of the user's head.

16. The method of claim 15, further comprising:
receiving tracking data for determining a position of the inertial measurement device within the vehicle; and
determining, based on the tracking data, a position of the inertial measurement device within the vehicle, wherein said determining a relative movement of the user's head relative to a reference frame of the movement of the vehicle is determined further based on the position of the inertial measurement device within the vehicle.

17. The method of claim 15, further comprising:
prior to said determining, synchronizing, based on respective times of measurement, the inertial measurements from the inertial measurement device and the inertial measurements from the additional inertial measurement device.

18. The method of claim 15, wherein said determining a relative movement of the user's head is determined based on:
   a most recently received inertial measurement from the inertial measurement device; and
   a most recently received inertial measurement from the additional inertial measurement device.

* * * * *